United States Patent [19]

Toth et al.

[11] 4,340,488

[45] Jul. 20, 1982

[54] PROCESS AND EQUIPMENT FOR ULTRASONIC CONDITIONING OF SEWAGE SLUDGES

[75] Inventors: András Tóth; Emese Tóth née Palotai; József Oláh; József Bitskey; Lajos Bulkai, all of Budapest, Hungary

[73] Assignee: Vizgazdalkodasi Tudomanyos Kutatokozpont, Budapest, Hungary

[21] Appl. No.: 251,365

[22] Filed: Apr. 6, 1981

Related U.S. Application Data

[63] Continuation of Ser. No. 138,403, Apr. 8, 1980, abandoned.

[30] Foreign Application Priority Data

Apr. 13, 1979 [HU] Hungary .............................. TO 1103

[51] Int. Cl.³ .............................................. C02F 1/24
[52] U.S. Cl. .................................... 210/705; 210/748; 210/764; 204/158 S
[58] Field of Search ............... 210/608, 703, 704, 705, 210/706, 707, 748, 764, 785, 221.1, 221.2; 204/157.1 S, 158 S; 209/1

[56] References Cited

U.S. PATENT DOCUMENTS

| 2,780,360 | 2/1957 | Bon | 210/221.1 |
| 3,264,213 | 8/1966 | Pav | 210/748 |
| 3,677,935 | 7/1972 | Spragg | 210/748 |
| 3,969,245 | 7/1976 | Ramirez | 210/702 |
| 4,086,057 | 4/1978 | Everett | 210/748 |

FOREIGN PATENT DOCUMENTS

| 5235456 | 9/1975 | Japan | 210/221.1 |
| 52-1567 | 7/1977 | Japan | 210/748 |
| 7407334 | 12/1974 | Netherlands | 210/764 |
| 500271 | 4/1937 | United Kingdom | 210/748 |

OTHER PUBLICATIONS

Reed, "Dissolved Air Flotation of Poultry Processing Waste", J. W. P.C.F., vol. 48, No. 1, Jan. 1976, p. 107.

Primary Examiner—Ernest G. Therkorn
Attorney, Agent, or Firm—Young & Thompson

[57] ABSTRACT

The invention serves for conditioning and sterilization of sludges originating from sewage treatment plants, and from water preparing plants, respectively, in such a manner, that both the homogenization and the mixing with coagulating agent of the sludge as well as the flotation separation of solid phase are carried out by ultrasonic treatment, while the microorganisms, among them also the pathogene ones, are decomposed. The conditioning agent added in the final phase of the ultrasonic treatment of a few minutes is metallic salt in case of biological sludges, and polyeletrolyte in case of sludges containing chemicals.

2 Claims, 1 Drawing Figure

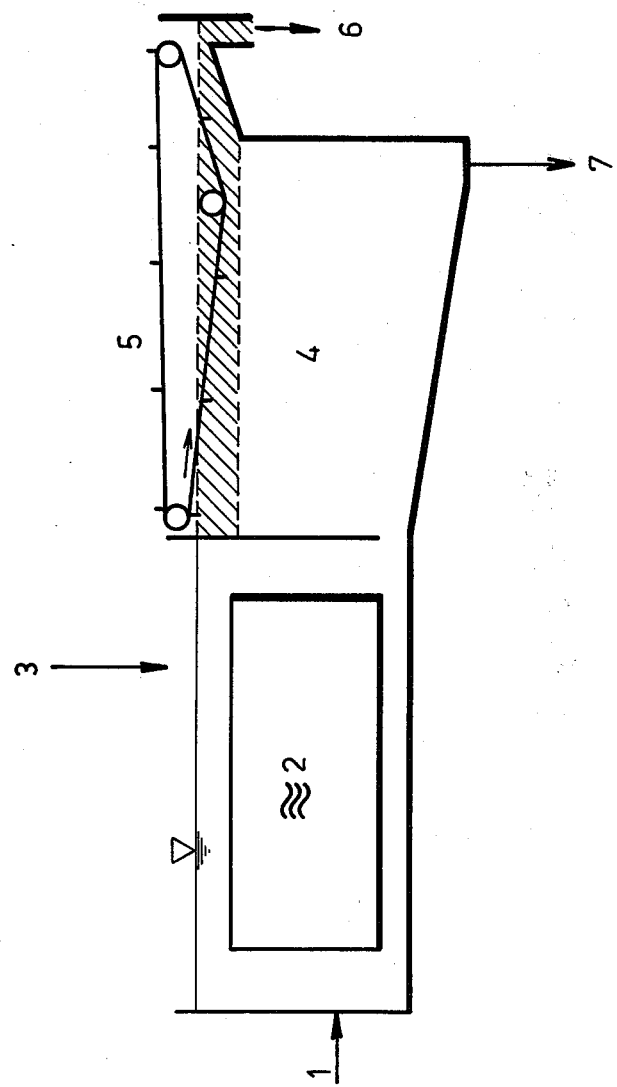

PROCESS AND EQUIPMENT FOR ULTRASONIC CONDITIONING OF SEWAGE SLUDGES

This is a continuation of application Ser. No. 138,403, filed Apr. 8, 1980, now abandoned.

The subject matter of the invention is a sludge conditioning method, which yields in a sterile sludge, easily separable from the water phase, having a consistence rendering possible its conduction directly to the mechanical dewatering (belt filter, vacuum filter, etc.).

The aim of sludge conditioning is generally the dewatering of sludge to be more easily carried out. The heat treatment results also in a sterile sludge—being the secondary effect of the conditioning—the chemical treatment improves the thickening power of sludge, whereas the biological conditioning (e.g. putrefaction) reduces the putrefying ability of sludge. (Benedek: Házi szennyvizek tisztitása-Purification of home sewages-Tankönyvkiado 1972, p. 170).

In the thermal sludge conditioning processes the sludge is held in heated up state at 200° C., whereby a sludge to be well dewatered can be obtained. The high power consumption and the reduced manurial value (in case of being located in the agriculture) are, however, detrimental. (Benedek-Németh: A szennyviziszap kezelése magyarországi viszonyok között-Treatment of sewage sludge under the conditions of Hungary-1968 VITUKI Tanulmányok és Kutatási Eredmények-VITUKI Studies and Research Results-No 22, pp. 7-8.).

The most widely used sludge conditioning method is the anaerobic putrefaction, as a consequence of which, in addition to the conditioning also the most part of pathogene bacteria perishes, whereas a considerable quantity of dangerous pathogens remains, however, living. The disease germ of tuberculosis, e.g. perishes only for 85% after a putrefaction of 35 days. (Process design manual for sludge treatment and disposal-US. Environmental Protection Agency, Technology Transfer October, 1974, EPA 625/1-74-006 Table 5-9.)

The survival capacity of worm ovules is more higher.

If the treated sludge is utilized for agricultural purposes (manuring), the risk of infection exists. According to Swiss authors (E. Hess-C. Beer: Die Dünglichkeit der Klärschlamm-Hygienisierung-Gaz-Eaux-Eaux usées 56 année 1976 No. 7, p. 385) the fresh sludge contains in average $10^5$ Salmonellae per liter, whereas the putrefied sludge $10^3$ units. This means that 1% of the infecting microorganisms remains living after the putrefaction. The reduction of number of E.coli bacteria is of the same efficiency in the course of putrefaction. Consequently, the desinfecting effect of putrefaction is limited, moreover, the required dwelling time of about 30 days renders necessary the building of large putrefying constructions. According to the same article, the pasteurizing following the putrefaction (heat treatment at 70° V at 30 minutes) results in a reduction of $10^4$–$10^9$-times of entero-bacteria—more particularly of Salmonellae.

The suggested other desinfecting method completing the anaerobic putrefaction is the Cobalt-60 radiation. 300 krad result in a $10^4$–$10^9$-times reduction of enterobacteria.

The desinfecting effect of both methods mentioned above considerably exceeds that of the anaerobic sludge putrefaction, the drawback of pasteurizing, however, consists in that it is highly power consuming, whereas the radioactive irradiation renders necessary a very expensive safety equipment.

When the putrefaction is omitted and chemical sludge conditioning is applied, a complementary desinfection is also necessary. The sludge without putrefaction is malodorous and the chemical treatment of the sludge requires expensive chemical agents (e.g. polyelectrolytes, ferric chloride).

The recent investigations stated that with the feeding of inorganic coagulants the metallic hydroxide sols aggregate in a few seconds to large-size gels, therefore they can display their effect adequately only if they can enter into connection with the sludge particles in a few seconds. Since the usual stirring methods are not suitable for this purpose, the over-dosage of chemical agents becomes necessary at the chemical sludge conditioning. (Licskó: A pH, a kontakt idő és speciális szerves szennyezések hatása a koagulációra.-The effect of pH, the contact time and special organic contaminations on the coagulation. 1979, VITUKI Tudomanyos Napok 4. ülesszak, p. 11).

The sludge-compost production taken for equivalent to the pasteurizing should be also mentioned, for which, however, large space is required, the sludge and some sort of moistener (e.g. household refuse, sawdust, ash) should be kept in mixed state for 6–12 mounths.

The aim of our solution was to develop an efficient sludge conditioning method with short dwelling time, the flocs resulting therefrom as well separable from the water phase, are well filtrable and the sludge-cake is not infectious. For this purpose the thin or compact sludge should be decomposed by ultrasonic treatment, the dispersed homogeneous colloidal mass obtained in this way should be mixed with clearing agent and thereby coagulated. The admixing of chemical agents is ensured by the ultrasonic treatment within a few seconds. The cavitation effect of the gas bubbles separating out as a consequence of the ultrasonic treatment promotes also the decomposition, and at the same time it separates by flotation the coagulated sludge phase. In the course of the process the microorganisms forming the sludge become decomposed, their infectious effect is eliminated and their cell water releases.

The essence of the solution is represented in FIG. 1. The pipe 1 is the feeding point of the sludge, the plates transmitting the ultrasonic sound are arranged in the front part of the by-pass construction. In the vicinity of the end corresponding to the travel direction of the plates transmitting the ultrasonic sound the feeding of chemical agents occurs. Above the flotation space 4 a skimming belt 5 is arranged. The discharge point of the conditioned sludge is the pipe 6, whereas that of the water phase is the sump, and pipe, respectively, 7.

The raw, surplus and mixed sludge of the biological sewage treatment plant, or the sludge of the water preparing equipment (e.g. purifier operating with chemicals, deironing facilities, sand filters) shall be forwarded to the conditioning construction either gravitationally or by pumping, in thin or compact state, through the pipe 1. The plates immersed in the sludge flowing through shall be made vibrate with ultrasonic frequency. After a flowing-through for 10 minutes the sludge will be completely decomposed, while through the feeder of chemicals 3 coagulating agent shall be added. In case of biological sewage purifier, this agent is metallic salt, preferably aluminium sulfate; in case of chemical sludge, it is either contained in the sludge, or it is some kind of organic polyelectrolyte. The ultrasonic treatment provides for an efficient mixing in a few seconds. As a consequence of the treatment, the sludge will warm up to about 70° C. The warming up increases the desinfecting effect. The thickenings and thinnings occurring as a consequence of the ultrasonic treatment, separate the gases dissolved in the liquid in form of bubbles which in the flotation space 4 make ascend the flocculent sludge to the surface. This flocculent sludge is removed by the skimming belt 5 through the pipe 6 and the sludge arrives directly into the sludge dewatering filter, or, for want thereof, onto the desiccating bed. The water phase flowing out through the pipe 7 shall be recirculated into the primary settling tank.

The fundamental advantages of the invention are as follows:
- short dwelling time, small volume, and space requirement, respectively,
- it results in sterile sludge to be used without restraint for agricultural purposes (in garden, too),
- the process does not reduce the manurial value,
- inexpensive conditioning agent may be used (e.g. aluminium sulfate),
- the ultrasonic treatment provides for an intensive admixing of chemicals without admixing agent,
- due to the quick and intensive admixing, the utilization of chemicals is economic,
- the extract content of the flotation condensate is high (about 10%), the capacity of sludge filter or desiccating bed may be well utilized,
- the power input is of short period (10 minutes, and when pasteurizing 30 minutes),
- the separation of flotation phase may be achieved without air admission,
- the organic substance content of the water phase is lower than with the thermic sludge conditioning process (Porteus-Von Roll), which similarly releases the cell water.

The experiments were carried out with two kinds of sludge:
1. Surplus active sludge of the biological sewage treatment plant of Délpest (sludge concentration 21.9 g/l).
2. Sludge containing chemicals obtained after precipitation with 200 mg/l of crystalline aluminium sulfate ($Al_2/SO_4/_3.18$ $H_2O$) of the primary settled sewage of the sewage treatment plant of Délpest (sludge concentration 10.5 g/l).

The ultrasonic treatment was carried out in case of both sludges by means of the laboratory ultrasonic destructing device of typ MSE (British product). The applied frequency was 20 Kc/s, the oscillation amplitude was 7.3 $\mu$m. As a consequence of the treatment, the capillary suction time of sludge considerably reduced. Since a correlation exists between the capillary suction time and the specific filtering resistance, it follows that the filtering resistance reduces also considerably (Malina, J. F. J.: Sludge Filtration and Sludge Conditioning, FIG. 213, p. 386, Water Quality Improvement by Physical and Chemical Processes 111, 1970).

The initial capillary suction time of 213 seconds of active sludge was reduced to 46 seconds by ultrasonic treatment and by adding aluminium sulfate being 15.2% water-free referred to the dry substance of sludge.

The initial capillary suction time of 32 seconds of the sludge containing chemicals was reduced to 11 seconds exclusively by the ultrasonic treatment, whereas when adding polyelectrolyte referred to the dry substance of sludge (Praestol 444 K), it reduced to 8 seconds.

The reduction of number of bacteria caused by the ultrasonic treatment was investigated both in sewage sludge and in sporiferous bacterium culture (Bacillus genus) and it was stated that the initial rapid reduction was followed after 10 minutes by an insignificant change both with bacteria having 20° C. and those having 37° C. heat optimum (the pathogens belong to this latter group). Depending on the specific power input the reduction of number of bacteria was $10^4$–$10^9$-times, and after the pasteurizing at 70° C. for 30 minutes of the sludge samples, only a $10^4$-times reduction was found.

What we claim is:
1. A sludge treatment process, comprising feeding sludge to a first tank, applying ultrasonic vibration to the sludge in the first tank, feeding the sludge after ultrasonic vibration to a flotation tank, separating solids from the ultrasonic-treated sludge in the flotation tank solely by means of flotation of the solids to the surface of the material in the flotation tank by gas bubbles generated within the sludge during the course of ultrasonic treatment, and adding an inorganic chemical coagulating agent to the sludge in the first tank after the sludge has been decomposed to a dispersed homogeneous colloidal mass by the ultrasonic treatment in the first tank, said ultrasonic treatment mixing said coagulating agent into the sludge, the dwell time of the sludge in the first tank during ultrasonic treatment being about 10 minutes and the dwell time of the ultrasonic treated material in the flotation tank being about 5 to 10 minutes.

2. A process as claimed in claim 1, said agent being aluminum sulfate.

* * * * *